United States Patent
Dums

(10) Patent No.: US 9,121,560 B2
(45) Date of Patent: Sep. 1, 2015

(54) MOTOR VEHICLE

(71) Applicant: Dr. Ing. h.c. F. Porsche Aktiengesellschaft, Stuttgart (DE)

(72) Inventor: Karl Dums, Renningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 49 days.

(21) Appl. No.: 14/080,124

(22) Filed: Nov. 14, 2013

(65) Prior Publication Data

US 2014/0146557 A1 May 29, 2014

(30) Foreign Application Priority Data

Nov. 23, 2012 (DE) .......................... 10 2012 111 352

(51) Int. Cl.
| | |
|---|---|
| *F21V 5/00* | (2015.01) |
| *F21S 8/10* | (2006.01) |
| *B60Q 1/00* | (2006.01) |
| *B60Q 5/00* | (2006.01) |
| *G10K 9/13* | (2006.01) |
| *G10K 13/00* | (2006.01) |

(52) U.S. Cl.
CPC ............ *F21S 48/1225* (2013.01); *B60Q 1/0017* (2013.01); *B60Q 5/008* (2013.01); *F21S 48/00* (2013.01); *F21S 48/1233* (2013.01); *F21S 48/15* (2013.01); *F21S 48/155* (2013.01); *F21S 48/30* (2013.01); *G10K 9/13* (2013.01); *G10K 13/00* (2013.01)

(58) Field of Classification Search
CPC ........................................................ B60Q 1/52
USPC ........................................................... 362/520
See application file for complete search history.

(56) References Cited

U.S. PATENT DOCUMENTS

| | | | | |
|---|---|---|---|---|
| 5,635,903 | A * | 6/1997 | Koike et al. ................... | 340/441 |
| 2008/0123871 | A1* | 5/2008 | Trzmiel .......................... | 381/86 |
| 2010/0141419 | A1 | 6/2010 | Coward | |
| 2010/0266135 | A1* | 10/2010 | Theobald et al. ............ | 381/71.4 |
| 2011/0175718 | A1* | 7/2011 | Inoue ............................ | 340/463 |

FOREIGN PATENT DOCUMENTS

| | | |
|---|---|---|
| DE | 195 40 768 | 5/1997 |
| DE | 10 2011 056 784 | 6/2013 |
| EP | 2 565 079 | 3/2013 |
| GB | 2 306 634 | 5/1997 |
| GB | 2 481 989 | 1/2012 |
| JP | 2007-283809 | 11/2007 |
| JP | 2011-201520 | 10/2011 |
| WO | 92/01586 | 2/1992 |

OTHER PUBLICATIONS

German Search Report of Aug. 16, 2013.

* cited by examiner

*Primary Examiner* — Evan Dzierzynski
(74) *Attorney, Agent, or Firm* — Gerald E. Hespos; Michael J. Porco; Mattew T. Hespos

(57) ABSTRACT

The invention relates to a motor vehicle having a lighting device (4-7), which is combined with a noise-output device, and having an electrical drive device. In order to optimize a motor vehicle having a lighting device, which is combined with a noise output device, and having an electrical drive device in respect of the installation space required for the noise output device, at least one diffusing lens of the lighting device (4) is designed as a sound-emitting device.

10 Claims, 2 Drawing Sheets

MOTOR VEHICLE

CROSS REFERENCE TO RELATED APPLICATION

This application claims priority under 35 USC 119 to German Patent Appl. No. 10 2012 111 352.1 filed on Nov. 23, 2012, the entire disclosure of which is incorporated herein by reference.

BACKGROUND

1. Field of the Invention

The invention relates to a motor vehicle having an electrical drive device and having a lighting device that is combined with a noise output device. The invention also relates to a method for operating a motor vehicle of this kind.

2. Description of the Related Art

DE 195 40 768 A1 discloses an acoustic signal apparatus in electric vehicles. The acoustic signal apparatus has acoustic signal transmitters integrated in the front lamp housings of the headlights and/or in front turn signal housings to produce an acoustic signal, such as the reproduction of a pleasant engine noise. WO 92/01586 A discloses a combination of reverse lights and a device that emits a sound for a heavy goods vehicle. The device comprises a piezoelectric element that is fit in the housing and interacts with a cover and a reflector to delimit a closed Helmholtz chamber. Further combinations of reverse lights and a device that emits a sound are disclosed in GB 2 481 989 A; GB 2 306 634 A; and US 2010/0141419 A1.

The object of the invention is to provide a motor vehicle with an electrical drive device and a lighting device combined with a noise output device where the installation space required for the noise output device is optimized.

SUMMARY OF THE INVENTION

A motor vehicle in accordance with the invention has an electrical drive device and a lighting device that is combined with a noise output device. The lighting device has at least one diffusing lens that is designed as a sound-emitting device. As a result, the entire air volume of the lighting device can be a resonance volume.

The diffusing lens preferably is combined with a noise-generating device. As a result, the diffusing lens is used for generating noise.

The diffusing lens preferably is coupled to an oscillating coil. The oscillating coil is fastened to a suitable point of the diffusing lens and can be used to make the diffusing lens oscillate in a targeted manner to generate noise.

The lighting device preferably is decoupled from a supporting structure in respect of transmission of sound. More particularly, a decoupling element can be arranged between a housing of the lighting device and the supporting structure.

The lighting device may comprise a headlight of the motor vehicle and a noise output device preferably is integrated in each headlight of the motor vehicle.

The lighting device may comprise a taillight of the motor vehicle and a noise output device preferably is integrated in each taillight of the motor vehicle.

The invention also relates to a method for operating a motor vehicle with an electric drive device in that the noise output device outputs a vehicle-specific driving noise when the motor vehicle is driven electrically. As a result, other road users can be made aware in a simple manner that an electrically driven motor vehicle is approaching.

The invention also relates to a lighting device and/or a diffusing lens for the a motor vehicle. The lighting device and/or the diffusing lens can be sold separately.

The invention also relates to using a diffusing lens for generating noise in a motor vehicle. As a result, a separate loudspeaker is unnecessary.

The invention also relates to using an air volume of the above-described lighting device as a resonance volume. As a result, the lighting device can be used to output noise in a particularly effective manner.

Further advantages, features and details of the invention can be found in the following description, in which various exemplary embodiments are described in detail with reference to the drawings.

DETAILED DESCRIPTION OF THE PREFERRED EMBODIMENTS

Figure 1:
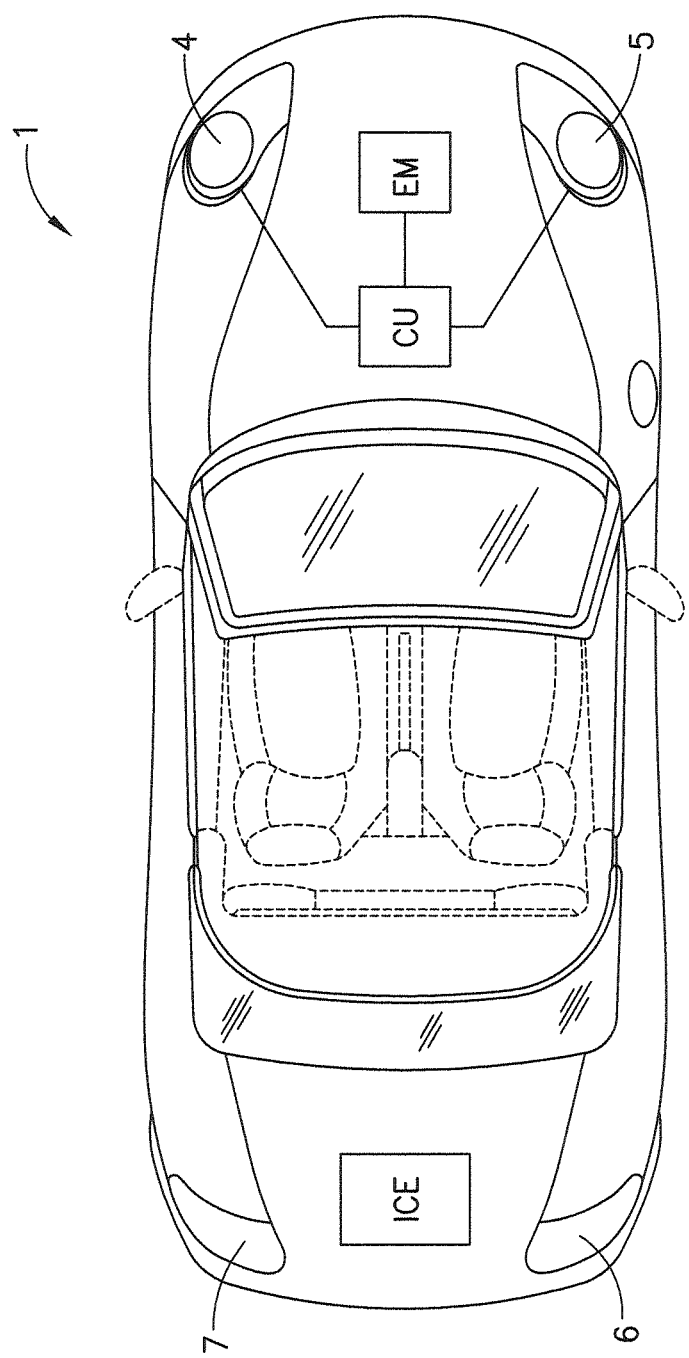
FIG. 1 shows a plan view of a motor vehicle according to the invention.

FIG. 1 shows a plan view of a motor vehicle 1 having four lighting devices 4, 5, 6, 7. The lighting devices 4, 5 are two front headlights of the motor vehicle 1. The lighting devices 6, 7 are two taillights of the motor vehicle 1.

The motor vehicle 1 has at least one electrical drive device EDD. In this case, the motor vehicle 1 can be a purely electric vehicle or a hybrid vehicle which, in addition to the electrical drive device EDD, also comprises another drive device, such as an internal-combustion-engine drive device ICE.

The lighting devices 4 to 7 are combined with noise output devices that are operative during purely electric driving of the motor vehicle 1 to generate an acoustic signal or noise or a sound that resembles an operating noise of a motor vehicle with an internal-combustion-engine drive. As a result, other road users, such as pedestrians, can be warned or made aware in a simple manner that a motor vehicle with an electrical or electromotive drive is approaching. The motor vehicle 1 further comprises a control unit CU that generates an electric signal for producing the noise when the electric drive device EDD drives the motor vehicle 1.

Figure 2:
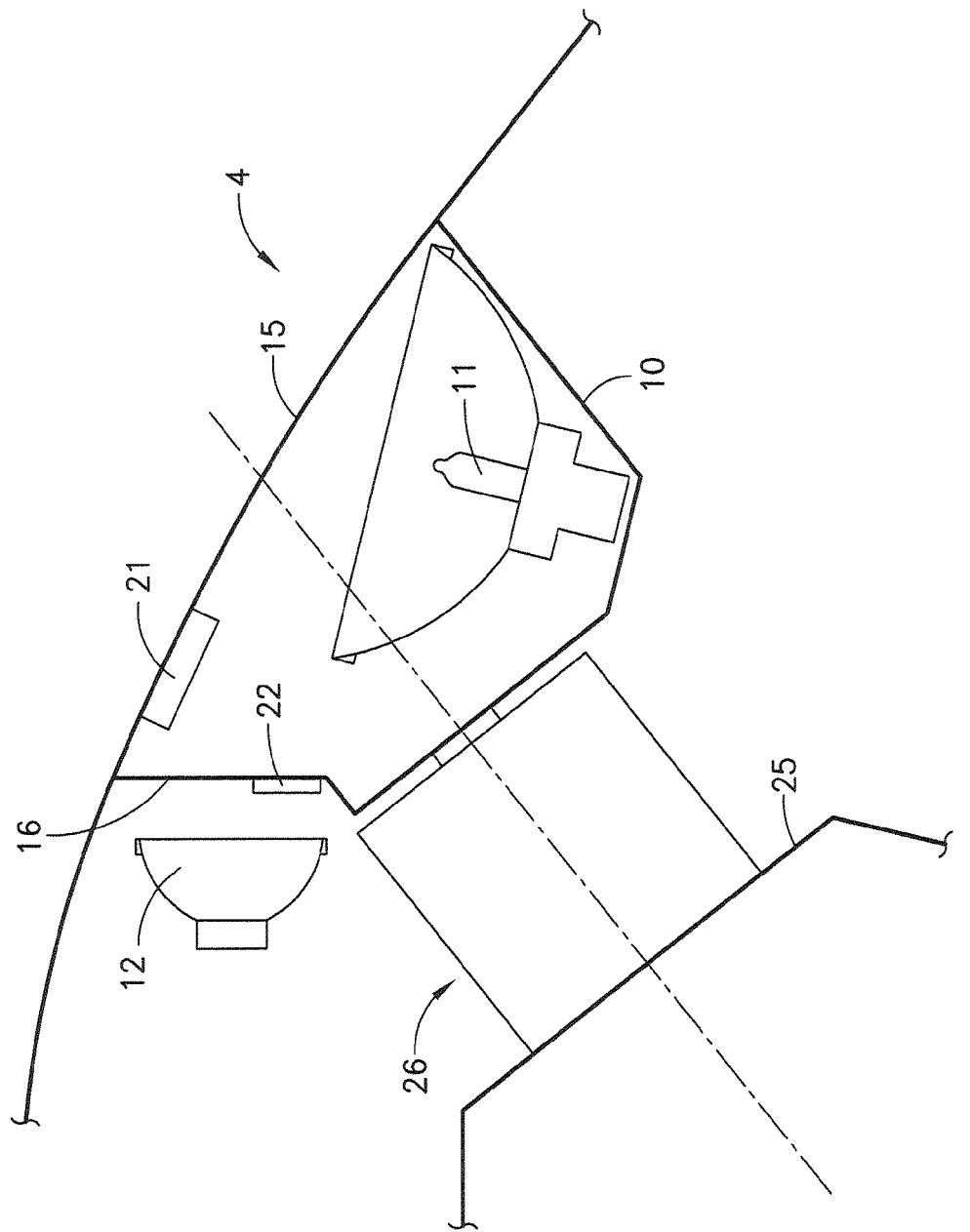
FIG. 2 shows a lighting device of the motor vehicle from FIG. 1 in section.

FIG. 2 shows the headlight 4 in section. The headlight 4 comprises a housing 10 on which two light sources 11, 12 are arranged. A diffusing lens 15, 16 is associated with each light source 11, 12 and the diffusing lens 15, 16 are designed as sound-emitting devices.

To this end, the diffusing lenses 15 are combined respectively with noise-generating devices 21 and 22. The noise-generating devices 21, 22 are oscillating coils that are coupled to the diffusing lenses 15, 16.

The diffusing lenses 15, 16 can be made to oscillate in a targeted manner by the oscillating coils to generate the above-described noise. In this case, the diffusing lenses 15, 16 advantageously are arranged so that sound is emitted to the outside as far as possible without obstruction.

The entire air volume in the interior of the housing 10 of the lighting device 4 advantageously can be used as a resonance volume or resonance space. The use of the diffusing lenses 15, 16 provides the advantage that a separate diaphragm for forming a loudspeaker can be dispensed with.

A decoupling element 26 is between a supporting structure 25 of the motor vehicle 1 and the housing 10 of the lighting device 4 to decouple oscillation of the lighting device 4. As a result, sound generated by the noise output device of the invention does not disturb any of the vehicle occupants in the interior of the motor vehicle 1. The decoupling element 26 may comprise an elastomeric support to isolate vibrations in the lighting device 4 from the remainder of the motor vehicle 1.

What is claimed is:

1. A motor vehicle having an electrical drive device, the motor vehicle comprising: at least one lighting device having at least one diffusing lens and an oscillating coil mounted directly on the diffusing lens and causing the diffusing lens to oscillate in a specified manner for generating noise.

2. The motor vehicle of claim 1, further comprising a decoupling element for mounting the lighting device to a supporting structure of the motor vehicle for decoupling oscillation of the diffusing lens from the supporting structure.

3. The motor vehicle of claim 1, wherein the lighting device comprises a headlight of the motor vehicle.

4. The motor vehicle of claim 1, wherein the lighting device comprises a taillight of the motor vehicle.

5. A method for operating a motor vehicle that has an electrical drive device, the method comprising: sensing whether the motor vehicle is being driven by the electrical drive device; generating an electric signal for causing at least one oscillating coil mounted directly on at least one diffusing lens of at least one lighting device of the motor vehicle and causing the at least one diffusing lens to oscillate in a way that outputs a vehicle-specific driving noise when the motor vehicle is driven electrically.

6. A diffusing lens for lighting device for a motor vehicle, comprising an oscillating device mounted directly to the diffusing lens and causing the diffusing lens to oscillate in a specified manner for emitting a sound from the diffusing lens.

7. A lighting device for a motor vehicle, comprising:
a housing;
at least one light source mounted to the housing; and
the diffusing lens of claim 6 mounted to the housing.

8. The lighting device of claim 1, wherein the diffusing lens and the housing are configured to define a closed resonance volume therebetween.

9. The lighting device of claim 8, wherein the at least one light source is disposed in the resonance volume.

10. The lighting device of claim 8, further comprising a decoupling element for decoupling vibration of the diffusing lens from the motor vehicle.

\* \* \* \* \*